United States Patent Office 3,081,286
Patented Mar. 12, 1963

3,081,286
POLYMERIZATION OF OLEFINES WITH A GROUP Va OR VIa METAL OXIDE-ALUMINUM TRIALKYL-ALKANOL CATALYST
Art C. McKinnis, Long Beach, Calif., assignor, by mesne assignments, to Collier Carbon and Chemical Corporation, a corporation of California
No Drawing. Filed Nov. 19, 1956, Ser. No. 622,799
9 Claims. (Cl. 260—93.7)

This invention relates to the polymerization of olefines, and in particular concerns an improved process for polymerizing normally gaseous mono-olefines to solid polymers of high molecular weight.

It is known that combinations of aluminum trialkyls or triaryls with certain polyvalent metal oxides catalyze the polymerization of normally gaseous mono-olefines to form tough solid polymers of high molecular weight. Conventionally, the catalyst consists of an aluminum trialkyl or triaryl, e.g., aluminum triethyl or triphenyl, and an oxide of a metal of Group Va or VIa (left-hand subgroup of Group V or VI, respectively) of the Mendeléeff Periodic Table, e.g., vanadium oxide, supported on a carrier material such as alumina or silica. The polymerization reaction is carried out by contacting the olefine with such catalyst in the presence of an inert liquid reaction medium at temperatures and pressures of the order of 20°–250° C. and 1–100 atmospheres, respectively.

The present invention is based on my discovery that in the process described above a very substantial increase in the yield of polymer can be obtained by replacing all or part of the aluminum trialkyl or triaryl component of the mixed catalyst with a dialkyl or diaryl aluminum alkoxide or aryloxide. Such compounds may be defined by the general formula:

wherein $R_1$ and $R_2$ each represents an alkyl or aryl group. The improvement in polymer yield attained through the use of such compounds in lieu of or in addition to aluminum trialkyls or triaryls is realized in the polymerization of any of the normally gaseous mono-olefines or mixtures thereof, but is particularly striking in the case of propylene where the improvement is as much as threefold or greater. Except for the difference in the organo-aluminum component of the catalyst, the present process is very similar to that referred to above, i.e., the organo-aluminum compound is employed in combination with an oxide of a metal of Groups Va or VIa (transition heavy metals of Groups V and VI) of the Mendeléeff Periodic Table supported on a carrier material, and the polymerization reaction itself is carried out in the presence of an inert liquid reaction medium under conventional conditions of temperature and pressure.

Considering now the process of the invention in greater detail, it is applicable to the polymerization of any normally gaseous mono-olefine or mixture thereof, e.g., ethylene, propylene, the butylenes, mixtures of ethylene and propylene, etc., but is of especial advantage as applied to the polymerization of propylene. Such olefines and mixtures thereof may be employed in substantially pure form or they may be provided in admixture with other hydrocarbons which are inert with respect to the catalyst; thus, a suitable starting material for the preparation of polypropylene may be a gas containing propane or the like in addition to propylene. Ordinarily, however, because of the exceptional activity of the catalyst, it is preferred that the olefines be employed in substantially pure form.

As stated above, the organo-aluminum component of the catalyst comprises a compound of the formula:

wherein $R_1$ and $R_2$ each represent a monovalent radical selected from the class consisting of alkyl and aryl groups, e.g., methyl, ethyl, propyl, iso-butyl, hexyl, octyl, decyl, cetyl, eicosyl, phenyl, methylphenyl, isobutylphenyl, etc. As will be apparent, these compounds fall into four groups: (1) dialkyl aluminum alkoxides, such as dimethyl aluminum methoxide, diethyl aluminum cetoxide, di-octyl aluminum t.-butoxide, etc.; (2) dialkyl aluminum aryloxides, such as dimethyl aluminum phenoxide, diisobutyl aluminum ethyl phenoxide, di-octyl aluminum naphoxide, etc.; (3) diaryl aluminum alkoxides, such as diphenyl aluminum heptoxide, etc.; and (4) diaryl aluminum aryloxides such as diphenyl aluminum phenoxide, diphenyl aluminum methylphenoxide, etc. These compounds are readily obtained by reacting an aluminum trialkyl or triaryl with an alkanol or phenol in accordance with the equation:

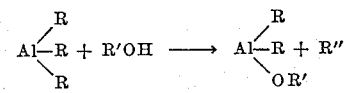

wherein R and R' each represent the same or different alkyl or aryl groups and R" represents the hydrocarbon corresponding to R. Thus, dimethyl aluminum isopropoxide and methane are formed by reacting aluminum trimethyl with isopropanol. The reaction takes place at ambient temperatures and pressures and, as is hereinafter more fully explained, may be carried out simultaneously with the polymerization reaction to form the dialkyl or diaryl aluminum alkoxide or aryloxide in situ. By reason of their ready availability and ease of preparation, in situ or otherwise, it is preferred to employ the compounds of group (1), i.e. dialkyl aluminum alkoxides obtained by reacting an aluminum trialkyl with an alkanol.

As previously stated, the organo-aluminum component of the mixed catalyst may consist entirely of one or a mixture of the above-described dialkyl or diaryl aluminum alkoxides or aryloxides, or it may comprise one or a mixture of such compounds in admixture with one or a mixture of aluminum trialkyls or triaryls. In the latter instance, the mole ratio of the trialkyl or triaryl to the alkoxide or aryloxide may be as high as 4 to 1, but is preferably about 2 to 1 or lower.

The metal oxide component of the catalyst is an oxide of a metal selected from the class consisting of the metals of Groups Va and VIa of the Mendeléeff Periodic Table, e.g., an oxide of vanadium, tantalum, chromium, molybdenum, etc., supported on a catalyst carrier material which is conventionally a difficultly reducible metal oxide, such as alumina, silica, titania, etc. Chromia supported on alumina-silica is preferred. Clays, diatomaceous earth, and similar inert materials having large surface area may also be employed as support materials. Deposition of the catalytic metal oxide on the support may be effected by precipitation, impregnation, co-precipitation, sublimation, etc. According to a preferred mode of operation, the support material is impregnated with an aqueous solution of a water-soluble salt of the desired metal, and the impregnated support is then dried and calcinated by heating in the presence of air at, say, 1000° F. for 8 hours to oxidize the metal salt to the corresponding oxide. Alternatively, an alumina, silica, or alumina-silica gel may be admixed with a salt or an oxide of the desired metal, and thereafter dehydrated and calcined to obtain the metal oxide deposited on an alumina, silica or alumina-silica carrier. Also, if desired, the metal oxide may be precipitated directly on the carrier material, or a suitable metal hydroxide may be precipitated on the carrier and thereafter dehydrated to form the oxide. The valence state of the metal is not definitive of operability; accordingly, any oxide of the metals in question may be employed, e.g., $CrO_3$, $Cr_2O_3$, $CrO_2$, $V_2O_5$, $VO_2$, $TaO_2$, $NbO_2$, $MoO_3$, etc. Should it be desired to employ one of the lower oxides, such can be conveniently obtained by impregnating or otherwise combining the support material with a higher oxide and thereafter treating the same with a reducing gas such as hydrogen, carbon monoxide, etc. Also, if desired, there may be employed mixed metal oxide catalysts obtained by impregnating the carrier with a suitable metal salt of an oxy-acid in which a suitable metal appears in the anion, and thereafter calcining in the usual manner. Thus, chromium molybdate may be formed on the support and then calcined to obtain a supported chromium oxide-molybdenum oxide catalyst. In general, the supported metal oxide catalysts employed in the present process are prepared by entirely conventional methods, and any of the known techniques employed in the catalyst preparation art may be applied. The supported metal oxide may take the form of granules of varying particle size, pellets, beads, etc., and any of the known methods for preparing supported catalysts in such forms may be employed. Usually, the composition will comprise between about 0.5 and about 30 percent by weight of a suitable metal oxide or mixture thereof and between about 99.5 and about 70 percent by weight of the support material, although the relative proportions of metal oxide and support are not in any way critical and a considerably larger or even smaller proportion of metal oxide may be employed if desired.

The reaction medium may be a saturated aliphatic hydrocarbon such as hexane, heptane, octane, decane, cetane, etc., or a petroleum distillate which essentially comprises saturated aliphatic hydrocarbons, e.g., naphtha, kerosene, etc. Aromatic hydrocarbons, such as benzene, toluene, xylene, cumene, decalin, tetralin, methylnaphthalenes, etc.; cycloaliphatic hydrocarbons, such as cyclohexane, dimethylcyclopentane, etc.; and olefinic hydrocarbons, such as heptene, cetene, dodecene, etc., may be also employed. In the interests of ease in handling it is preferred that the reaction medium be a liquid at ambient temperatures and pressures, although from an operability standpoint it is necessary only that it be a liquid under the polymerization conditions employed. A particularly preferred class of reaction media consists of normally liquid aliphatic tertiary olefines in which the unsaturated linkage occurs at the tertiary carbon atom, e.g., di-isobutylene, liquid propylene polymer, etc. In order to avoid poisoning the catalyst the reaction medium should be free from water, oxygen, carbon dioxide, and sulfur compounds; any of the well known purification methods may be applied in effecting the removal of such impurities.

The polymerization reaction itself is carried out in conventional manner, i.e., batchwise or continuously at temperatures between about 20° C. and about 250° C. and at pressures between about 1 and about 100 atmospheres. According to one mode of operation, the liquid reaction medium and supported metal oxide catalyst are placed in a suitable pressure vessel, and air in the vessel is replaced with dry nitrogen. The organo-aluminum component of the catalyst is then introduced below the surface of the reaction medium, after which the vessel is closed and heated to the desired reaction temperature. The gaseous olefinic charge stock is then introduced into the vessel under the desired pressure, and heating is continued with the olefine being introduced continuously or intermittently to maintain the pressure. During the course of the reaction, the temperature is readily controlled by reason of the presence in the reaction zone of a relatively large quantity of the liquid reaction medium. If necessary, however, heat can be removed from or added to the reaction zone by suitably heat exchanging the reaction medium inside or outside the reaction vessel. When the reaction is complete, as indicated by the pressure within the reaction zone attaining a steady value, the reaction vessel is cooled and depressured and the contents are removed and treated, as by filtration and washing, to separate the solid polyolefine product from the catalyst and reaction medium.

According to a second mode of operation, the dialkyl or diaryl aluminum alkoxide or aryloxide component of the catalyst is formed in situ by charging to the reaction vessel a suitable aluminum trialkyl or triaryl and a suitable alkanol or phenol. Thus, should it be desired to employ, say, aluminum tributyl and dibutyl aluminum hexoxide in a 1/1 mole ratio, two molecular equivalents of aluminum tributyl and one molecular equivalent of hexyl alcohol are introduced into the reaction vessel containing the supported metal oxide and reaction medium, and the olefine is added and the polymerization carried out as previously explained. The alcohol and one-half of the aluminum tributyl react more or less immediately to form one molecular equivalent of dibutyl aluminum hexoxide, leaving one molecular equivalent of aluminum dibutyl unreacted. The hexane which is formed as a by-product serves as additional reaction medium.

The proportions in which the catalyst, reaction medium and olefinic charge stock are employed may be varied between relatively wide limits. Ordinarily, sufficient of the liquid reaction medium is employed that from about 1 to about 50, preferably from about 5 to about 10, parts by weight of the same are provided per part of polymerizable olefine present in the reaction zone. The combined weight of the organo-aluminum and metal oxide catalyst (excluding the support material) will usually represent between about 0.005 and about 25, preferably between about 0.01 and about 10, percent by weight of the amount of polymerizable olefine present in the reaction zone. The relative proportions of organo-aluminum compound or compounds and the metal oxide may likewise be varied widely, but it is preferred that at least about 1, preferably at least about 2.5, moles of the organo-aluminum component be provided per mole of metal oxide, and that such mole ratio not exceed about 10 to 1. The contact time or space velocity is dependent upon the other process variables, e.g., reaction temperature and pressure, catalyst composition, charge stock identity, etc., as well as upon the characteristics desired in the polymer product, and this variable is adjusted by experimentation to attain the desired result. As stated above, the course of the polymerization reaction can be followed by observing the variation in the pressure within the reaction zone, with complete polymerization being indicated by such pressure assuming a substantially fixed value. Under ordinary conditions of batch operation at 250° F., between about 1 and about 3 hours are required for completion of the reaction. When operating continuously, liquid hourly space velocities of the order of about 0.1 and about 10 volumes of reaction medium and polymerizable olefine are suitable.

The following examples will illustrate several ways in which the principle of the invention may be applied, but are not to be construed as limiting the invention. All proportions are given in parts by weight.

*Example I*

One hundred parts of an alumina-silica (12/88 ratio by weight) catalyst support in the form of ⅛-inch pellets are impregnated with 50 parts of a 4 percent aqueous solution of chromic oxide, and the impregnated support is dried in the air at room temperature for about 24 hours. The dried catalyst is then calcined by heating in air at 1000° F. for about 12 hours. Sixty parts of the supported chromia (2%) so prepared are then added to 179 parts of di-isobutylene and 1.6 parts of n-butanol contained in a pressure vessel and 8 parts of aluminum triisobutyl are added below the surface of the solvent and under a blanket of nitrogen. The vessel is then closed and heated to about 100° C., after which 300 parts of propylene are introduced into the vessel under pressure. Heating is continued for 3 hours, by which time the pressure within the vessel drops to a fixed value. The vessel is then cooled and the contents are removed, washed with acetone, filtered, and dried at 100° C. The yield of solid polypropylene is 115 parts. When the procedure is repeated employing the supported chromia as the sole catalyst, little solid polymer is obtained; similarly, when the procedure is repeated with an unimpregnated support, only a very small amount of polymer is recovered.

*Example II*

Fifty parts of triethyl aluminum are dissolved in 50 parts of cyclohexane and an equimolecular amount of n-butanol is added with stirring. The cyclohexane is distilled off at atmospheric pressure, after which the residue is distilled at reduced pressure. Diethyl aluminum n-butoxide, distilling at about 96° C. under 0.1 mm. pressure, is obtained in 95 percent yield. When the procedure of Example I is repeated, substituting 10 parts of the diethyl aluminum butoxide for the aluminum triisobutyl and omitting the n-butanol, the conversion of propylene to solid high molecular weight polymer is about 60 percent. Similar results are obtained employing diethyl aluminum n-octoxide and diethyl aluminum 5-ethyl-2-nonoxide as the organo-aluminum component of the mixed catalyst.

*Example III*

Employing the general procedure described in Example I, but effecting the polymerization reaction at about 125° C. for 4 hours, a series of experiments is carried out employing different organo-aluminum catalysts and different reaction solvents. The following results are obtained:

| Organo-Aluminum Compound | Solvent | Solid Polymer Formed, parts |
|---|---|---|
| Aluminum tri-isobutyl | Cyclohexane | 37 |
| Do | Toluene | 35 |
| Do | Propylene Trimer | 80 |
| Di-isobutyl Aluminum n-butoxide | Cyclohexane | 60 |
| Do | Toluene | 52 |
| Do | Di-isobutylene | 154 |
| Do | Propylene Trimer | 156 |

*Example IV*

Ethylene is polymerized following the procedure of Example I, employing methanol instead of the n-butanol. The conversion of ethylene to solid polymer is about 95 percent.

*Example V*

Example I is repeated employing 1 percent chromia on activated silica gel as the supported metal oxide component of the catalyst mixture. The conversion of propylene to solid polymer is about 65 percent. Similar results are obtained with 5 percent chromia on titania-silica (80/20 weight ratio) and with 5 percent molybdena on alumina-silica. When ethylene is substituted for the propylene, the conversion to solid polymer is about 85 percent. Similar results are obtained with mixtures of ethylene and propylene.

Other modes of applying the principle of my invention may be employed instead of those explained, change being made as regards the methods or material employed, provided the step or steps stated by any of the following claims, or the equivalent of such stated step or steps, be employed.

I, therefore, particularly point out and distinctly claim as my invention:

1. The process which comprises subjecting a normally gaseous mono-olefine to a temperature between about 20° C. and about 250° C. and a pressure between about 1 and about 100 atmospheres in the presence of an inert liquid reaction medium, an oxide of a metal selected from the class consisting of the metals of Groups Va and VIa of the Mendeléeff Periodic Table carried on a support material, an aluminum trialkyl, and an alkanol; at least about 1 molecular equivalent of said aluminum trialkyl being provided per molecular equivalent of said alkanol, and said mono-olefine being subjected to said conditions for a period of time sufficient to effect the formation of a solid polymer.

2. A process as defined by claim 1 wherein from 1 to about 50 parts by weight of said liquid reaction medium are provided per part by weight of said olefine, the combined weight of said metal oxide and said aluminum trialkyl representing between about 0.005 and about 25 percent by weight of said olefine, and the mole ratio of said aluminum trialkyl and said metal oxide is between about 2.5/1 and about 10/1.

3. A process as defined by claim 2 wherein the said mono-olefine is ethylene.

4. A process as defined by claim 2 wherein the said mono-olefine is propylene.

5. A process as defined by claim 2 wherein the said metal oxide is an oxide of chromium.

6. A process as defined by claim 2 wherein the said metal oxide is an oxide of chromium and said support material is a mixture of alumina and silica.

7. A process as defined by claim 2 wherein the said reaction medium is an aliphatic mono-olefine in which the double bond occurs at a tertiary carbon atom.

8. A process as defined by claim 2 wherein the said reaction medium is di-isobutylene.

9. The process which comprises subjecting propylene to a temperature between about 20° C. and about 250° C. and a pressure between about 1 and about 100 atmospheres in the presence of an oxide of chromium carried on an alumina-silica support, an aluminum trialkyl, an alkanol, and di-isobutylene; the weight ratio of di-isobutylene to propylene being between about 1/1 and about 50/1, the combined weight of said oxide and said aluminum trialkyl representing between about 0.005 and about 25 percent of the weight of propylene, the mole ratio of said aluminum trialkyl and said oxide being between about 2.5/1 and about 10/1, and the mole ratio of said alkanol to said aluminum trialkyl being less than about 1/1.

References Cited in the file of this patent

UNITED STATES PATENTS 2,731,453  Field et al. _____ Jan. 17, 1956
2,824,089  Peters et al. _____ Feb. 18, 1958

FOREIGN PATENTS 534,792  Belgium _____ May 1, 1955